C. W. T. KRAUSCH.
Hand Car.
No. 37,818.
2 Sheets—Sheet 1.
Patented Mar. 3, 1863.
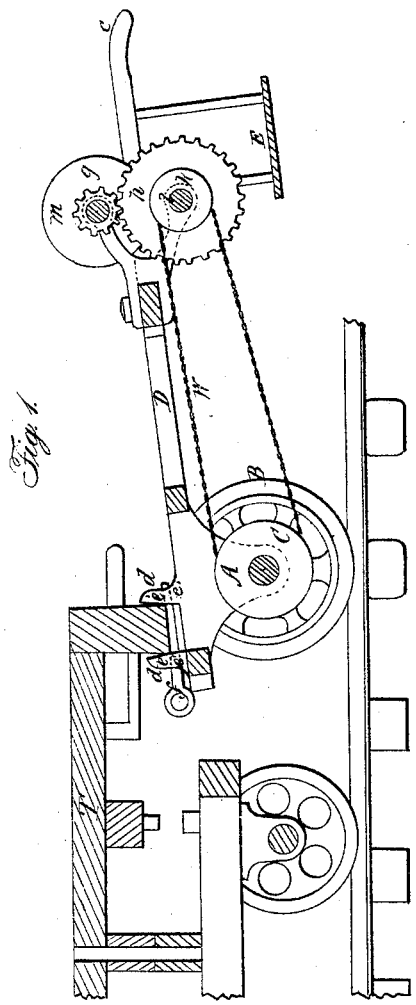
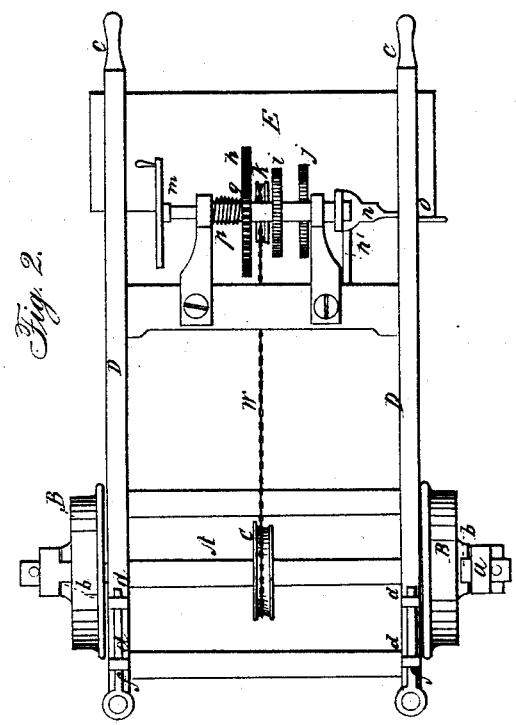
Witnesses:
Inventor:

C. W. T. KRAUSCH.
Hand Car.
No. 37,818.
2 Sheets—Sheet 2.
Patented Mar. 3, 1863.
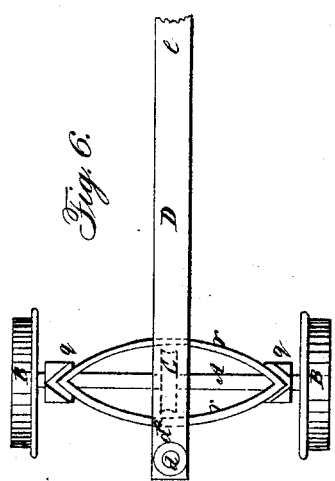
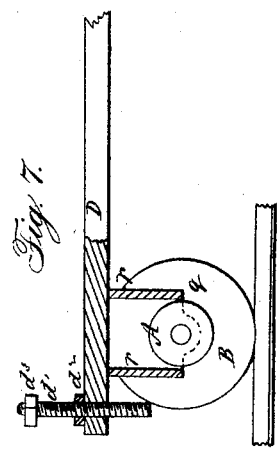
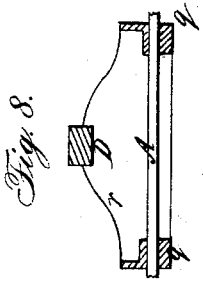
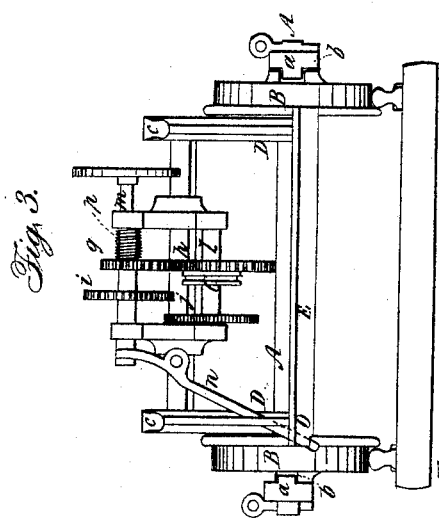
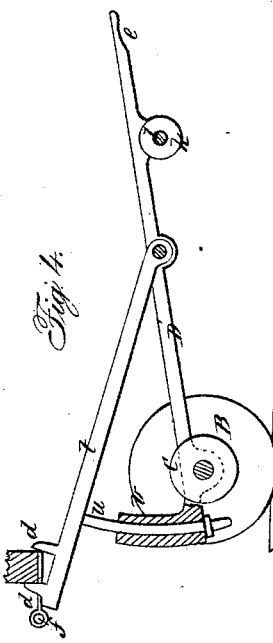
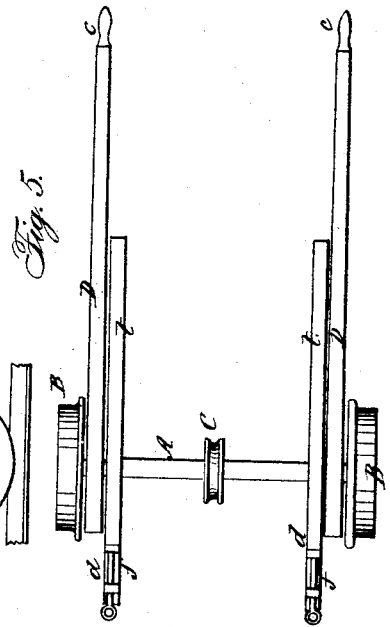
Witnesses:
Inventor:
AM. PHOTO-LITHO. CO. N.Y. (OSBORNE'S PROCESS)

UNITED STATES PATENT OFFICE.

C. W. THEODORE KRAUSCH, OF CHICAGO, ILLINOIS.

IMPROVEMENT IN MACHINES FOR MOVING RAILROAD-CARS.

Specification forming part of Letters Patent No. 37,818, dated March 3, 1863.

*To all whom it may concern:*

Be it known that I, C. W. THEODORE KRAUSCH, of Chicago, Cook county, State of Illinois, have invented a new and useful lever-traction hand-truck for moving or drawing and shoving cars from one place to another on the railroad; and I do hereby declare that the following is a full, clear, and exact description of the same, reference being had to the accompanying drawings, forming part of this specification, in which—

Figure 1 is a longitudinal section of my truck as in use for moving a car. Fig. 2 is a plan of the same, and Fig. 3 a front view. Figs. 4 and 5 are views of a modification of the plan shown in Figs. 1, 2, and 3 and in Figs. 6, 7, and 8. Figs. 6, 7, and 8 are views of another modification.

The same letters of reference in the several figures indicate corresponding parts.

The nature of my invention consists in a two-wheeled truck so constructed that by the gravity of the weight to be moved acting upon the rear end of the truck, and the suspended weight of the operator acting upon its forward end, shall produce the requisite traction or adhesion between the rails of a road and the wheels of the truck, and thus the power of the operator applied in an available manner, through suitable gearing, to the axle of the truck for the purpose of drawing or shoving cars from one place to another.

To enable others skilled in the art to make and use my invention, I will proceed to describe the same with reference to the drawings.

A is a revolving axle, carrying two car-wheels, B B, which are fitted so as to be made fast or loose at pleasure by means of tongued washers $a\ a$ and notches $b\ b$ in the hubs of the wheels. By reversing the ends of the washers the wheels are left free to revolve. The object of this is simply to render the truck useful as a barrow when not used for the purpose of moving cars, and in such use the gearing is not required to be operated, although it may all be in operative condition. About midway of the axle a grooved pulley, C, is placed and made fast. This axle is hung in boxes of a frame, D D, on the under side and a short distance from the rear end, as shown in Figs. 1, 2, and 3. The frame extends forward and terminates in two barrow-handles, $c\ c$, and on its rear extended portion, on top, jaws or boxes $d\ d$ are formed. These jaws are furnished with a series of holes, $e'\ e'$, for the passage of bearing bars $f\ f$, as shown.

E is a suspended platform. It is supported by rods projecting down from the under side of the barrow-handles $c\ c$. Just above this platform, on the front cross-bar of the frame D D, a series of gear-wheels, $g\ h\ i\ j$, and a grooved pulley, $k$, are arranged, the same being supported on shafts $l\ m$, which revolve in bracket-bearings $o\ p$ of the frame D D. The shaft $m$ is furnished with one or two hand crank-wheels, and it is also arranged to slide in its bearings. The object in having it to slide is that the slow-speed wheels $g\ h$ may be thrown out of gear and the fast-speed wheels $i\ j$ brought into gear, or vice versa, as occasion demands. The sliding motion is produced in one direction by a foot-lever, $n$, pivoted to the frame D D, and forked or clutched around the neck of the shaft $m$, the lower end of said lever fitting against a stop, $o$, of the platform E when the slow-speed wheels are in gear. A spiral spring, $p$, produces the sliding motion in an opposite direction when the lever is free from the notch $o$ and brings the fast-speed wheels in gear.

In Figs. 6, 7, and 8 I have shown a frame, D D, with only a central barrow or lever handle, $e$. In this form the lever is connected to the axle by means of boxes $q\ q$, projected down from two bowed plates, $r\ r$, united together at their ends on the boxes, as shown. The bowed plates give great strength, and at the same time make room for the grooved pulley C on the axle.

Instead of the jaws $d$, I provide an adjustable screw, $d'$, with a stop, $d^2$, and nut $d^3$, as shown.

In Figs. 4 and 5 a link or links, $t\ t$, are pivoted to the sides of the barrow-handles $c\ c$, and the jaws $d\ d$ are formed on the rear ends of these links, as shown. From the under side of the links sector-arms $u$ project down and are adjustable in the curved guides $v$, as shown. This plan may be a modification of either the one or two handle barrow previously described.

In operating with the invention the cross sill or timber at the front of the car bottom T is brought between the jaws $d\ d$, and the bars $f\ f$ adjusted to the height thereof so as to give the car a bearing; or the draw-head of the car is brought over the screw $d'$ and confined by a nut or stop and supported by a bar, $f$, adjusted to the proper height. The operator or operators get upon the platform E, and by their weight bring into play the leverage of the frame D D upon the car and upon the wheels B B, and thus cause the necessary traction or adhesion of the wheels upon the rails of the track. The gearing is now operated, and the power of the operators transmitted to the axle pulley from the pulley $k$ by means of a strong endless chain, $w$, as shown. This action upon the axle produces the rotation of the wheels and the movement of the truck and car connected to it.

My machine is very simple, and from practical operation with it it has been found admirably adapted for the purpose intended; and, beside this, it is a useful device for ordinary hand-truck purposes in many cases.

What I claim as my invention, and desire to secure by Letters Patent, is—

1. A lever-traction truck, substantially as described, and for the purpose set forth.

2. The providing of a truck which has two wheels with the suspended platform and the jaws $d\ d$, or their equivalents, substantially as described.

3. The providing of a truck which has two wheels and a lever-frame with gearing, as described, for the purpose set forth.

4. Tongued washers, in combination with the grooves in the wheels of a truck operating as described, for the purpose set forth.

Witness my hand in the matter of my improved machine for moving railroad-cars this 19th day of December, A. D. 1862.

C. W. THEO. KRAUSCH.

Witnesses:
WM. H. BRERETON,
G. T. ROSS.